United States Patent
Groffsky et al.

(10) Patent No.: US 11,490,708 B2
(45) Date of Patent: Nov. 8, 2022

(54) REUSABLE DISPENSER AND CARTRIDGE

(71) Applicant: ZGTL LLC, New York, NY (US)

(72) Inventors: Zachary Groffsky, New York, NY (US); Taylor Lane, New York, NY (US); Jochen R. Schaepers, New York, NY (US)

(73) Assignee: ZGTL LLC, New York, NY (US)

( * ) Notice: Subject to any disclaimer, the term of this patent is extended or adjusted under 35 U.S.C. 154(b) by 0 days.

(21) Appl. No.: 17/191,965

(22) Filed: Mar. 4, 2021

(65) Prior Publication Data
US 2021/0186178 A1  Jun. 24, 2021

Related U.S. Application Data

(63) Continuation-in-part of application No. 16/933,160, filed on Jul. 20, 2020, which is a continuation of
(Continued)

(51) Int. Cl.
*B43K 5/06* (2006.01)
*A45D 33/04* (2006.01)
(Continued)

(52) U.S. Cl.
CPC ............. *A45D 33/04* (2013.01); *A45D 34/04* (2013.01); *A45D 40/04* (2013.01);
(Continued)

(58) Field of Classification Search
CPC ...... A45D 2040/0043; A45D 2040/105; A45D 34/04; A45D 40/04; A45D 40/10; B65D 83/0038
See application file for complete search history.

(56) References Cited

U.S. PATENT DOCUMENTS 4,884,912 A   12/1989  Gueret
4,890,944 A   1/1990   Cousins et al.
(Continued)

FOREIGN PATENT DOCUMENTS

WO   2016062584 A1   4/2016

OTHER PUBLICATIONS

International Search Report and Written Opinion of the International Searching Authority issued in corresponding Appl. No. PCT/US18/27255 dated Jun. 28, 2018 (12 pages).

*Primary Examiner* — Jennifer C Chiang
(74) *Attorney, Agent, or Firm* — Carter, DeLuca & Farrell LLP; Joshua Zarabi

(57) ABSTRACT

A product dispensing apparatus including a reusable product dispenser and a refill cartridge configured to releasably couple to the reusable product dispenser. The reusable product dispenser includes a housing defining a longitudinal axis, a base rotatably coupled to a proximal portion of the housing, and a telescope assembly. The base is configured to rotate about the longitudinal axis in a first direction and a second direction. The telescope assembly includes a proximal section and a distal section movable relative to the proximal section along the longitudinal axis defined by the housing between a collapsed condition and an extended condition. At least one of the proximal section or the distal section is operably coupled to the base such that rotation of the base about the longitudinal axis causes corresponding rotation of the telescope assembly about the longitudinal axis.

17 Claims, 14 Drawing Sheets

Related U.S. Application Data application No. 16/402,729, filed on May 3, 2019, now Pat. No. 10,716,384, which is a continuation of application No. 15/793,185, filed on Oct. 25, 2017, now Pat. No. 10,278,473.

(60) Provisional application No. 62/484,501, filed on Apr. 12, 2017.

(51) Int. Cl.
| | | |
|---|---|---|
| *A45D 34/04* | (2006.01) | |
| *B65D 83/00* | (2006.01) | |
| *A45D 40/04* | (2006.01) | |
| *A45D 34/00* | (2006.01) | |
| *A45D 40/00* | (2006.01) | |

(52) U.S. Cl.
CPC .... *B65D 83/0038* (2013.01); *A45D 2034/005* (2013.01); *A45D 2040/0043* (2013.01); *A45D 2040/0062* (2013.01); *Y02W 30/80* (2015.05)

(56) References Cited

U.S. PATENT DOCUMENTS

| | | |
|---|---|---|
| 5,102,249 A | 4/1992 | Holloway et al. |
| 5,255,990 A | 10/1993 | Dornbusch et al. |
| 5,697,531 A | 12/1997 | Fattori |
| 5,738,123 A | 4/1998 | Szekely |
| 5,947,621 A | 9/1999 | Szekely |
| 5,984,553 A | 11/1999 | Piscopo et al. |
| 6,276,857 B1 | 8/2001 | Szekely |
| D654,812 S | 2/2012 | Wade |
| D732,388 S | 6/2015 | Toh et al. |
| D741,173 S | 10/2015 | Toh et al. |
| 9,210,985 B2 | 12/2015 | Arwatz et al. |
| D767,389 S | 9/2016 | Toh et al. |
| 9,896,249 B2 | 2/2018 | Decottignies |
| 10,278,473 B2 | 5/2019 | Groffsky et al. |
| 10,660,421 B2 * | 5/2020 | Crawford ............... A45D 40/00 |
| 10,716,384 B2 | 7/2020 | Groffsky et al. |
| 2014/0270892 A1 | 9/2014 | Linehan |
| 2016/0157580 A1 | 6/2016 | Crawford et al. |
| 2016/0183661 A1 | 6/2016 | Lefevre et al. |
| 2017/0247170 A1 | 8/2017 | Bilton |
| 2021/0289919 A1 * | 9/2021 | Thulin ................... A45D 40/14 |

\* cited by examiner

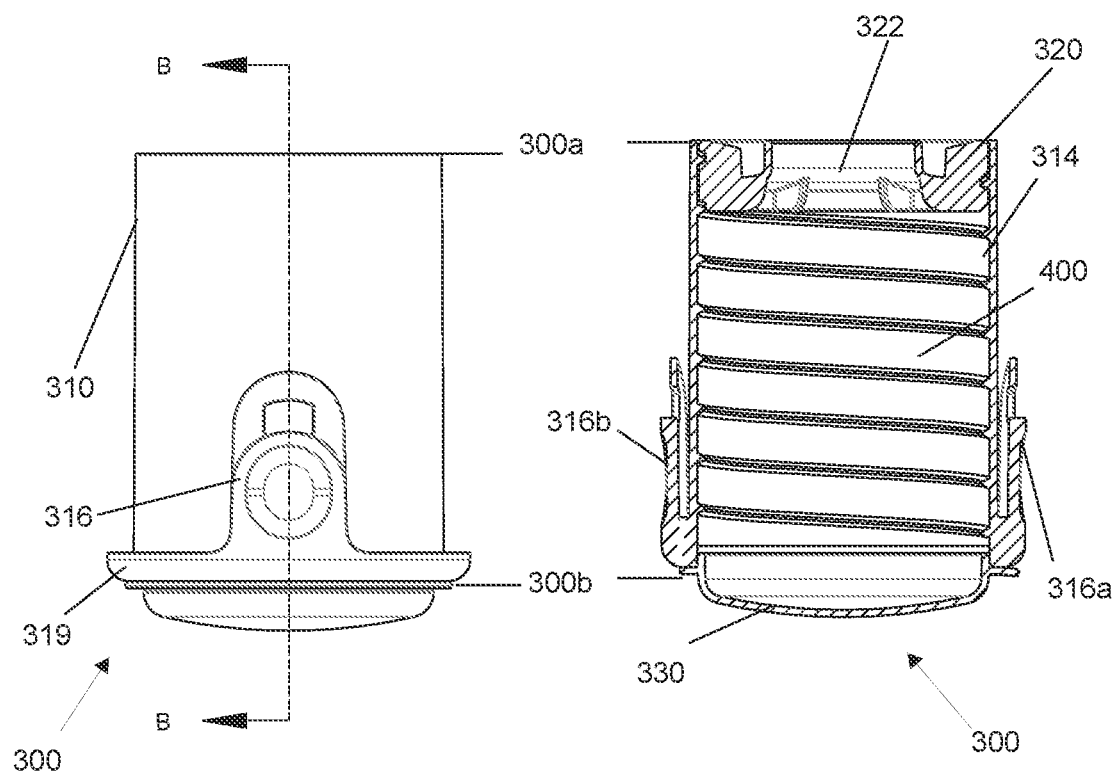

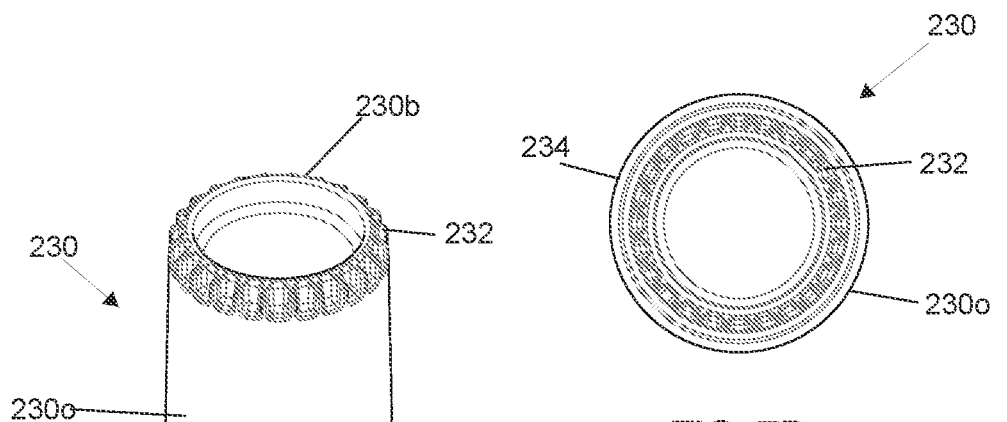
FIG. 7A
FIG. 7B
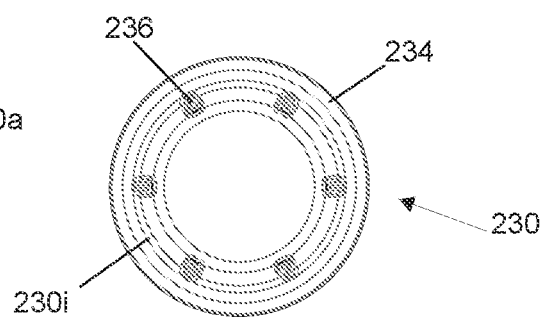
FIG. 7C
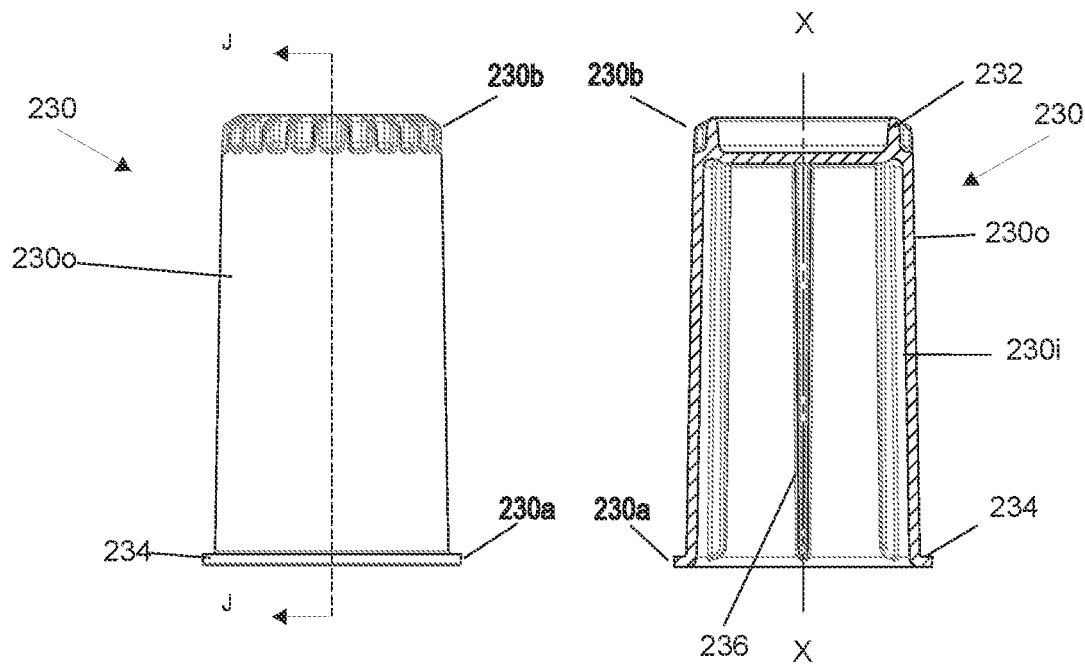
FIG. 7D
FIG. 7E

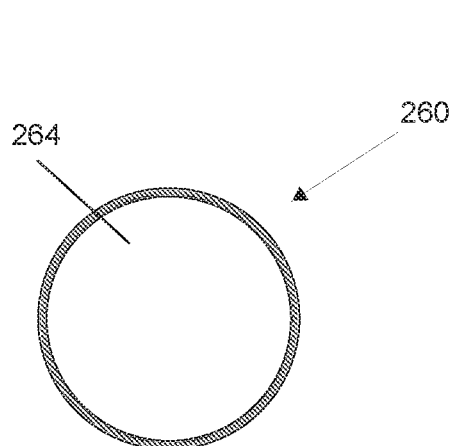
FIG. 9A
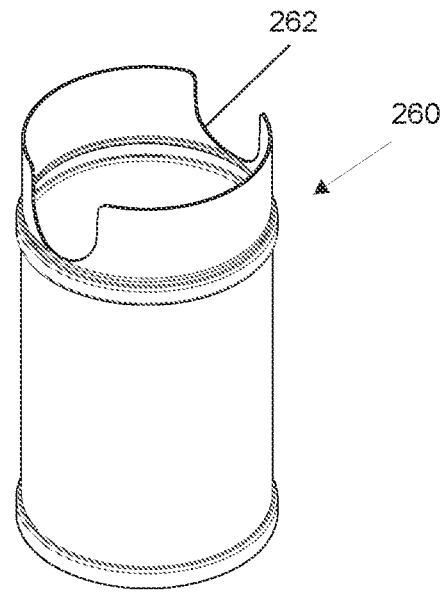
FIG. 9B
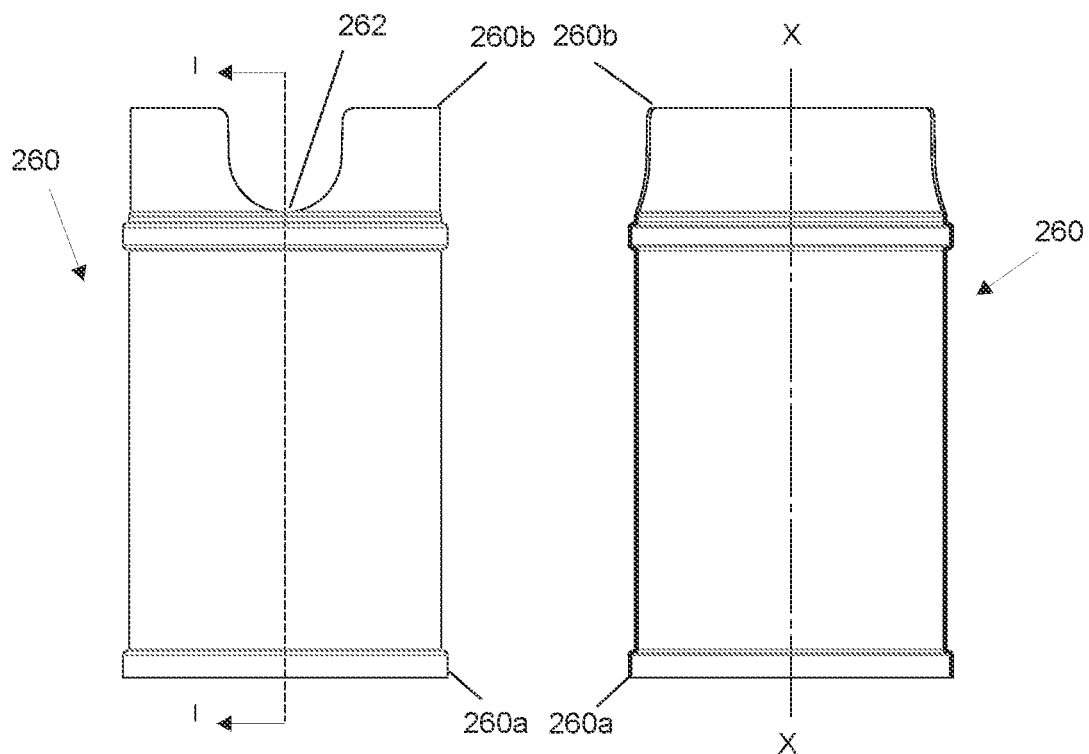
FIG. 9C
FIG. 9D

REUSABLE DISPENSER AND CARTRIDGE

CROSS-REFERENCE TO RELATED APPLICATIONS

This application is a continuation-in-part application of U.S. patent application Ser. No. 16/933,160, filed on Jul. 20, 2020, which is a continuation application of U.S. patent application Ser. No. 16/402,729, filed May 3, 2019, now U.S. Pat. No. 10,716,384, which is a continuation application of U.S. patent application Ser. No. 15/793,185, filed on Oct. 25, 2017, now U.S. Pat. No. 10,278,473, which claims priority to U.S. Provisional Patent Application Ser. No. 62/484,501, filed on Apr. 12, 2017, the entire contents of each of which are incorporated by reference herein.

FIELD

The present disclosure is directed to a product dispenser, particularly, a deodorant product dispenser. More particularly, the present disclosure is directed to a reusable product dispenser with a deodorant refill cartridge allowing for the cartridge to be changed without disposing of the whole product dispenser.

BACKGROUND

Dispensers for dispensing solid, liquid, and/or gel deodorant products are known. Typically, the product is extruded out of an outlet in a top end of the dispenser until the product is completed. The product dispensers are limited to single use, and after completion of the product within the dispenser, the consumer is left with no other option but to dispose of the empty dispenser and purchase a new, full, product dispenser.

A problem with this type of single-use product dispenser is that its single-use nature leads to excessive waste, thereby raising costs of manufacturing and reducing efficiency.

An approach to solving this problem of over-production of the product dispensers, as well as the effects on the manufacturing plants, is to create a reusable product dispenser that allows for the consumer to only purchase deodorant refill cartridges instead of complete product dispensers. This also allows manufacturers to use less material in production of replacement deodorant refill cartridges, than previously used.

SUMMARY

In accordance with an aspect of the present disclosure, a product dispensing apparatus is provided. The product dispensing apparatus includes a reusable product dispenser and a refill cartridge configured to releasably couple to the reusable product dispenser. The reusable product dispenser includes a housing defining a longitudinal axis, a base rotatably coupled to a proximal portion of the housing, and a telescope assembly. The base is configured to rotate about the longitudinal axis in a first direction and a second direction. The telescope assembly includes a proximal section and a distal section movable relative to the proximal section along the longitudinal axis defined by the housing between a collapsed condition and an extended condition. At least one of the proximal section or the distal section is operably coupled to the base such that rotation of the base about the longitudinal axis causes corresponding rotation of the telescope assembly about the longitudinal axis.

In an aspect, the proximal section of the telescope assembly is configured to fit at least partially within the distal section of the telescope assembly.

In an aspect, wherein the proximal section of the telescope assembly includes at least one of a guide configured to slide along a rail of the distal section of the telescope assembly or a rail configured to slide along a guide of the distal section of the telescope assembly.

In an aspect, the proximal section of the telescope assembly includes at least one of a guide configured to slide along a rail of the base or a rail configured to slide along a guide of the base.

In an aspect, the refill cartridge is configured to releasably couple to the telescope assembly.

In an aspect, the refill cartridge is configured to releasably couple to housing.

In an aspect, the reusable product dispenser includes a resilient member disposed between the base and the telescope assembly configured to bias the telescope assembly to the extended condition.

In an aspect, the housing is cylindrical in shape.

In an aspect, the telescope assembly is cylindrical in shape.

In another aspect of the present disclosure, a reusable product dispenser for use with a product refill cartridge is provided. The reusable product dispenser includes a housing defining a longitudinal axis, a base rotatably coupled to a proximal portion of the housing, and a telescope assembly. The base is configured to rotate about the longitudinal axis in a first direction and a second direction. The telescope assembly includes a proximal section and a distal section movable relative to the proximal section along the longitudinal axis defined by the housing between a collapsed condition and an extended condition. At least one of the proximal section or the distal section is operably coupled to the base such that rotation of the base about the longitudinal axis causes corresponding rotation of the telescope assembly about the longitudinal axis.

In an aspect, the proximal section of the telescope assembly is configured to fit at least partially within the distal section of the telescope assembly.

In an aspect, the proximal section of the telescope assembly includes at least one of a guide configured to slide along a rail of the distal section of the telescope assembly or a rail configured to slide along a guide of the distal section of the telescope assembly.

In an aspect, the proximal section of the telescope assembly includes at least one of a guide configured to slide along a rail of the base or a rail configured to slide along a guide of the base.

In an aspect, the base includes a centrally-located protrusion extending distally therefrom. Additionally, or alternatively, the proximal section of the telescope assembly may be disposed circumferentially around the protrusion of the base and the distal section of the telescope assembly may be disposed circumferentially around the proximal section of the telescope assembly.

In an aspect, the reusable product dispenser includes a resilient member disposed between the base and the telescope assembly configured to bias the telescope assembly to the extended condition.

In an aspect, the housing is cylindrical in shape.

In an aspect, the telescope assembly is cylindrical in shape.

In another aspect of the present disclosure, a reusable product dispenser for use with a product refill cartridge is provided. The reusable product dispenser includes a housing defining a longitudinal axis, a base rotatably coupled to a proximal portion of the housing, a telescope assembly, and a resilient member. The base is configured to rotate about the longitudinal axis in a first direction and a second direction. The telescope assembly includes a proximal section and a distal section movable relative to the proximal section along the longitudinal axis defined by the housing between a collapsed condition and an extended condition. The resilient member is configured to bias the telescope assembly to the extended condition. At least one of the proximal section or the distal section is operably coupled to the base such that rotation of the base about the longitudinal axis causes corresponding rotation of the telescope assembly about the longitudinal axis.

BRIEF DESCRIPTION OF THE DRAWINGS

Embodiments of the present disclosure are described herein with reference to the accompanying drawings, wherein:

FIG. 3A is a side view of the deodorant refill cartridge of the deodorant dispensing apparatus with a cap attached thereto;

FIG. 3B is a side, cross-sectional, view of the deodorant refill cartridge with the cap attached thereto, taken along the line B-B in FIG. 3A;

FIG. 7A is a perspective view of a telescope of the reusable product dispenser;

FIG. 7B is a top view of the telescope of the reusable product dispenser;

FIG. 7C is a bottom view of the telescope of the reusable product dispenser;

FIG. 7D is a side view of the telescope of the reusable product dispenser;

FIG. 7E is a side, cross-sectional, view of the telescope of the reusable product dispenser, taken along the line J-J in FIG. 7D;

FIG. 9A is a top view of a housing sleeve of the reusable product dispenser;

FIG. 9B is a perspective view of the housing sleeve of the reusable product dispenser;

FIG. 9C is a side view of the housing sleeve of the reusable product dispenser;

FIG. 9D is a side, cross-sectional, view of the housing sleeve of the reusable product dispenser, taken along the line I-I in FIG. 9C;

DETAILED DESCRIPTION

Figure 1C:
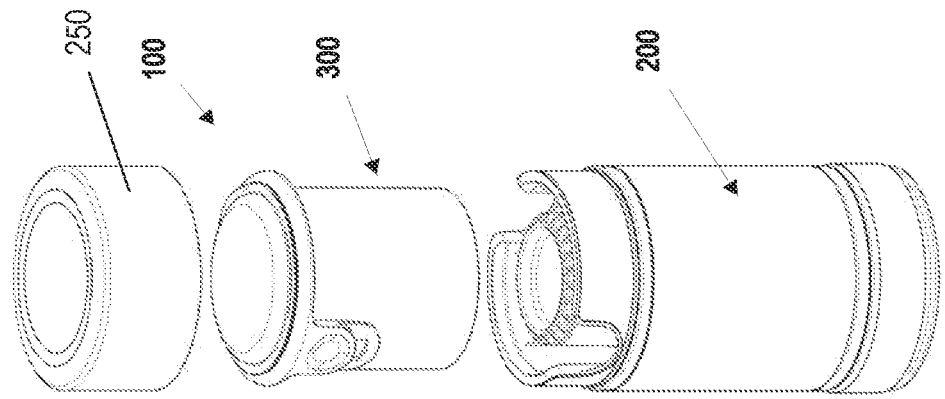
FIG. 1C is a perspective view of the deodorant dispensing apparatus of FIGS. 1A and 1B with the deodorant refill cartridge removed.

Embodiments of the presently disclosed dispensing apparatus, including a reusable product dispenser and a refill cartridge thereof, are described in detail with reference to the drawings, in which like reference numerals designate identical or corresponding elements in each of the several views.

As used herein, the term "distal" refers to that portion of the deodorant dispensing apparatus deodorant refill cartridge and its components that is closer to a user's body when in use (for example, further from the user's hand when in use), while the term "proximal" refers to that portion of the deodorant dispensing apparatus and its components that is further from the user's body when in use (for example, closer to the user's hand when in use).

As used herein, the term "user" refers to any individual seeking to apply a product to their body. In the following description, well-known functions or construction are not described in detail to avoid obscuring the present disclosure in unnecessary detail. Additionally, as used herein, the term "deodorant" refers to any deodorizing, non-deodorizing, cosmetic product, or other product which may include for example, perfumes, colognes, lipstick, cosmetics, ointments, antiperspirants, or any combinations thereof which may include those in liquid, gel, solid, powdered form, or any combinations thereof, which may include or not include deodorizing properties.

As will be described in detail below, provided is a deodorant dispensing apparatus which includes a reusable product dispenser and a deodorant refill cartridge, where the deodorant dispensing apparatus is configured to allow for selective insertion and removal of the deodorant refill cartridge to and from the reusable product dispenser.

Figure 1B:
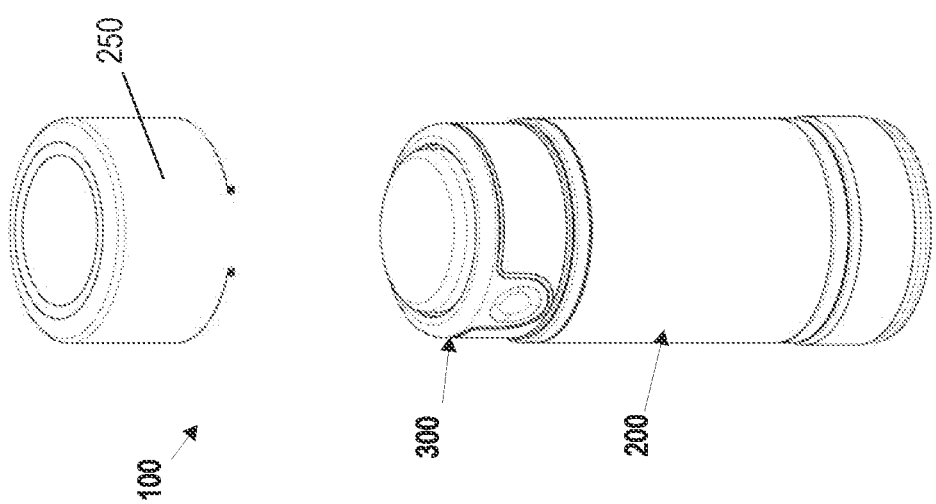
FIG. 1B is a perspective view of the deodorant dispensing apparatus of FIG. 1A with a cap of the deodorant dispensing apparatus removed and a deodorant refill cartridge installed therein.
Figure 1A:
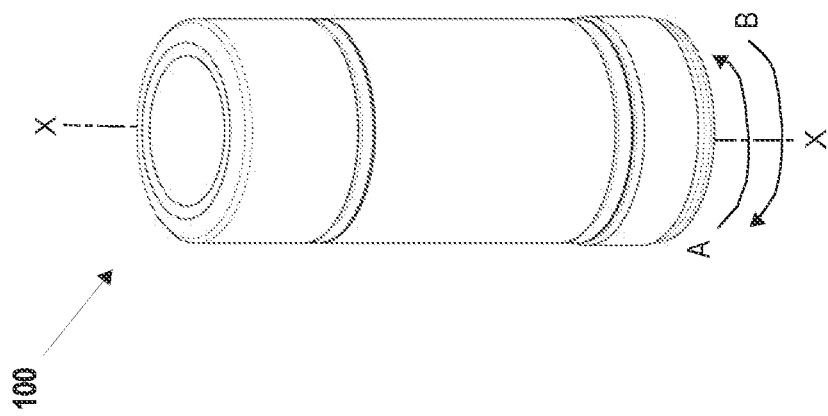
FIG. 1A is a perspective view of a deodorant dispensing apparatus in a closed and fully assembled condition, in accordance with an aspect of the present disclosure.

Referring initially to FIGS. 1A-1C, the deodorant dispensing apparatus 100 includes a reusable product dispenser 200 and a deodorant refill cartridge 300. The deodorant refill cartridge 300 may be at least partially inserted into, and releasably coupled to, the reusable product dispenser 200. The deodorant refill cartridge 300 is configured to house a deodorant product therein. When the deodorant refill cartridge 300 is coupled to the reusable product dispenser 200, the reusable product dispenser 200 can be manipulated to dispense the deodorant product from the deodorant refill cartridge 300. Upon depletion of the deodorant product housed within the deodorant refill cartridge 300, the deodorant refill cartridge 300 can be disposed of (or refilled with new deodorant product for subsequent use) and a new (or refilled) deodorant refill cartridge 300 can be coupled to the reusable product dispenser 200 for continued use. Each of the reusable product dispenser 200 and the deodorant refill cartridge 300 will be described in turn.

Figure 2B:
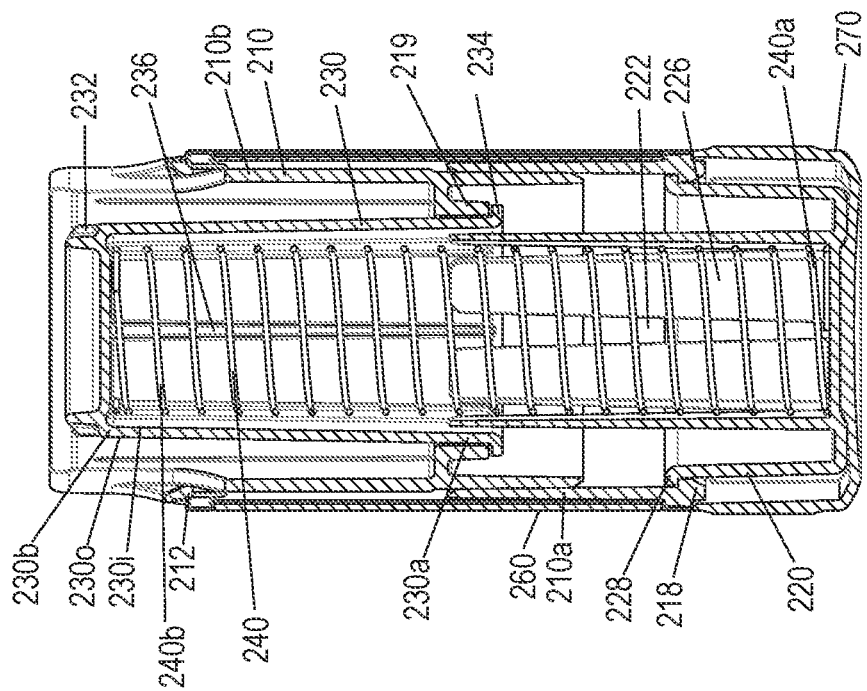
FIG. 2B is a side, cross-sectional, view of the reusable product dispenser of the deodorant dispensing apparatus, taken along the line A-A in FIG. 2A.
Figure 2A:
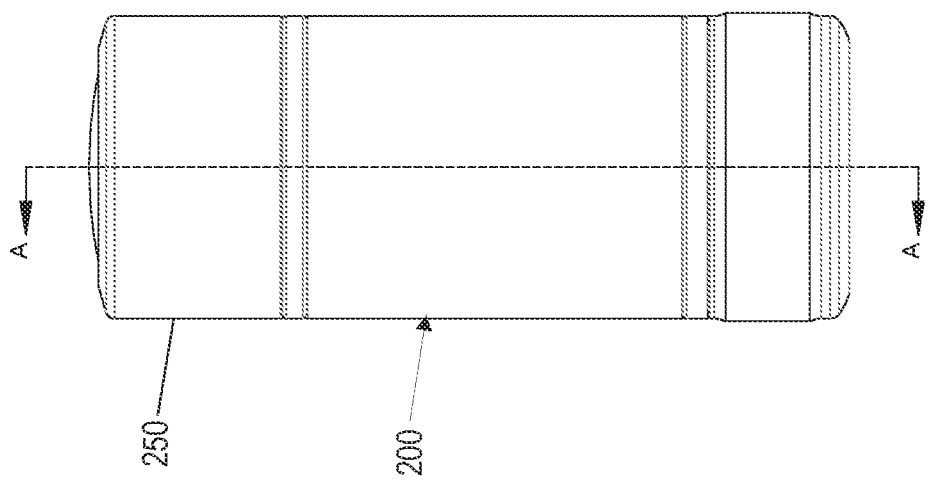
FIG. 2A is a side view of a reusable product dispenser of the deodorant dispensing apparatus of FIGS. 1A-1C.

With reference to FIGS. 2A-2B, the reusable product dispenser 200 includes a cylindrical housing 210, a base 220, a telescope 230, and a spring 240 disposed between the base 220 and the telescope 230. In aspects, the reusable product dispenser 200 additionally includes a cover 250 and a base cover 270. The cylindrical housing 210 defines a longitudinal axis X-X (FIG. 1A). The base 220 is rotatably coupled to the cylindrical housing 210 and configured to rotate relative to the cylindrical housing 210 about the longitudinal axis X-X in a first direction (indicated by arrow A in FIG. 1A) and a second direction (indicated by arrow B in FIG. 1A). The telescope 230 is operably coupled to the base 220 such that rotation of the base 220 about the longitudinal axis X-X in either the first or second direction, causes corresponding rotation of the telescope 230 about the longitudinal axis X-X in the same direction. The spring 240 biases the telescope 230 away from the base 220.

The cylindrical housing 210 is configured to receive at least a portion of the deodorant refill cartridge 300 therein. The cylindrical housing 210 includes a latching mechanism receiver 212 configured to receive and releasably engage a portion of the deodorant refill cartridge 300 and secure the deodorant refill cartridge 300 to the cylindrical housing 210. In particular, the latching mechanism receiver 212 of the cylindrical housing 210 releasably engages the latching mechanism 316 (FIG. 4) of the deodorant refill cartridge 300. In an aspect, the latching mechanism receiver 212 is disposed on a distal portion 210b of the cylindrical housing 210 and the latching mechanism 316 is disposed on a distal portion of the deodorant refill cartridge 300.

Figure 5A:
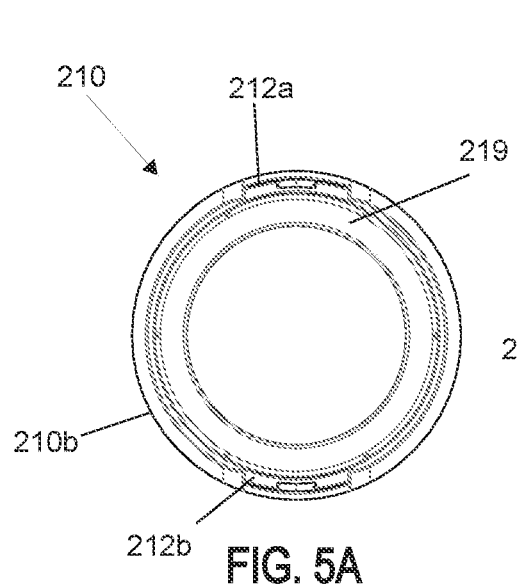
FIG. 5A is a top view of a cylindrical housing of the reusable product dispenser.
Figure 5B:
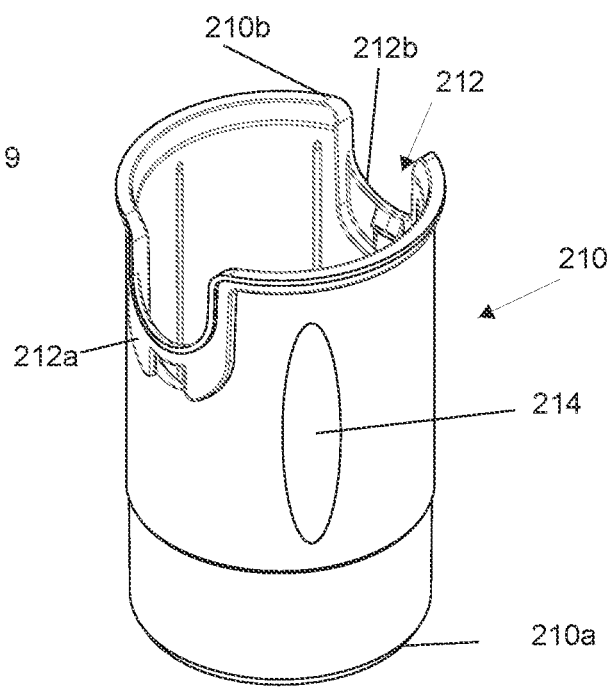
FIG. 5B is a perspective view of the cylindrical housing of the reusable product dispenser.
Figure 5C:
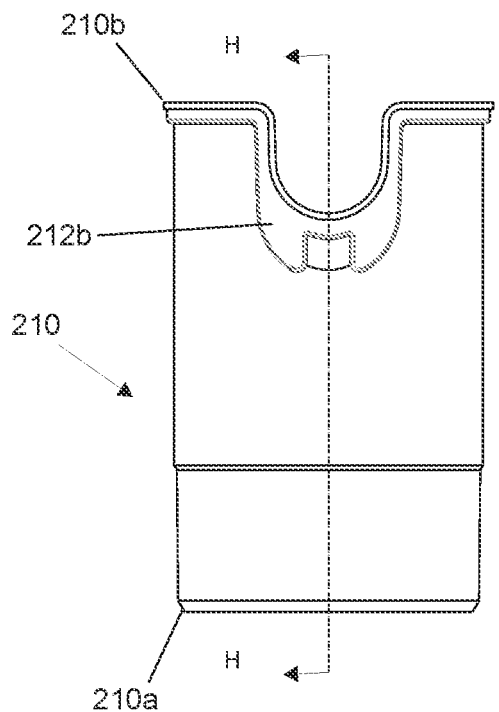
FIG. 5C is a side view of the cylindrical housing of the reusable product dispenser.
Figure 5D:
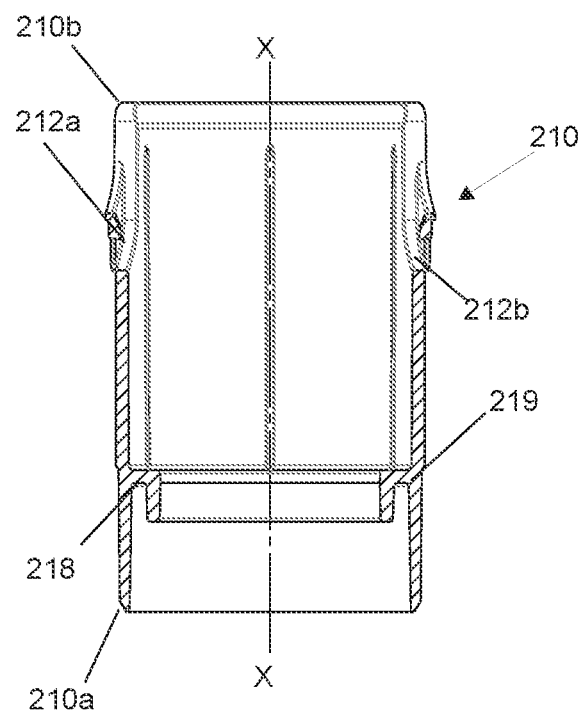
FIG. 5D is a side, cross-sectional, view of the cylindrical housing of the reusable product dispenser, taken along the line H-H in FIG. 5C.

Additionally or alternatively, the latching mechanism receiver 212 of the cylindrical housing 210 may include a first latching mechanism receiver 212a (FIG. 5B), to engage a first latching mechanism 316a (FIG. 3B) of the deodorant refill cartridge 300, and a second latching mechanism receiver 212b (FIG. 5B), to engage a second latching mechanism 316b (FIG. 3B) of the deodorant refill cartridge 300, disposed on opposite sides of the cylindrical housing 210.

The cylindrical housing 210 may additionally include a level indicator 214 (FIG. 5B) disposed along a portion of an outer wall of the cylindrical housing 210 and configured to provide a view through the outer wall of the cylindrical housing such that components disposed within the cylindrical housing 210 may be visible. For example, the level indicator 214 of the cylindrical housing 210 may provide visibility of the deodorant refill cartridge 300 (or any components thereof), when the deodorant refill cartridge 300 is coupled to the cylindrical housing 210.

The cylindrical housing 210 may include a notch 218 for coupling the base 220 to the cylindrical housing 210. The notch 218 may be disposed at the proximal portion 210a of the cylindrical housing 210. In an aspect, the notch 218 of the cylindrical housing is configured to mate with a locking mechanism 228 of the base 220 to couple the base 220 to the cylindrical housing 210. In an aspect, the locking mechanism 228 of the base 220 is configured to mate with the notch 218 of the cylindrical housing 210 such that the base may be releasably coupled to the cylindrical housing 210. Additionally or alternatively, the locking mechanism 228 of the base 220 may be configured to permanently mate with the notch 218 of the cylindrical housing 210. In either aspect, the base 220 is rotatable relative to the cylindrical housing 210.

The telescope 230 is disposed within the cylindrical housing 210 and longitudinally movable relative thereto. The cylindrical housing 210 includes a stop member 219 configured to prevent further distal longitudinal movement of the telescope 230 relative to the cylindrical housing 210 (as the telescope 230 is biased distally by the spring 240) when a flange 234 of the telescope 230 engages the stop member 219. In an aspect, the stop member 219 of the cylindrical housing 210 is disposed at the proximal portion 210a of the cylindrical housing 210. Additionally, in an aspect, the stop member 219 is disposed on, or along, an inner wall of the cylindrical housing 210. As illustrated in FIG. 2B, the stop member 219 prevents distal advancement of the telescope 230 when the flange 234 of the telescope 230 engages the stop member 219. In an aspect, the flange 234 is a tab that protrudes orthogonally from the telescope 230 at one point along the circumference of the proximal portion 230a of the telescope 230. Alternatively, the flange 234 may span the entire circumference of the proximal portion 230a of the telescope 230 and have an outer diameter that is larger than the outer diameter of the proximal portion 230a of the telescope 230.

The base 220 of the reusable product dispenser 200 includes spring holster 226 configured to support the spring 240 therein. The spring holster 226 of the base 220 may be disposed centrally within the base 220 and is configured to receive the proximal portion 240a of the spring 240. A distal portion 240b of the spring is operably coupled to the telescope 230 and biases the telescope 230 away from the base 220. Thus, the spring 240 of the reusable product dispenser 200 is disposed between the base 220 and the telescope 230 and biases the telescope 230 distally along the longitudinal axis X-X. The distal portion 240b of the spring 240 is disposed adjacent the inner wall 230i of the telescope 230 and proximal portion 240a of the spring 240 is disposed within the spring holster 226 of the base 220. The spring 240 is in a decompressed state prior to installation of the deodorant refill cartridge 300 into the reusable product dispenser 200 and is in compressed state after installation of the deodorant refill cartridge 300 into the reusable product dispenser 200.

The spring holster 226 also defines at least one slot 222 to mate with an inner rib 236 of the telescope 230. The slot 222 of the base 220 is configured to operably mate with the telescope 230 such that rotation of the base about the longitudinal axis X-X causes corresponding rotation of the telescope 230 about the longitudinal axis X-X in the same direction. In an aspect, the telescope 230 includes a rib 236, disposed on an inner wall 230i of the telescope 230, configured to slide within the slot 222 defined by the base 220. The telescope 230 may be coupled to the base 220, within slot 222, such that the telescope is freely movable in a longitudinal direction along longitudinal axis X-X (e.g., distally and proximally). The rib 236 extends from a proximal portion 230a of the telescope 230 to a distal portion 230b of the telescope 230. Although described and illustrated as the telescope 230 including a rib 236 and the base 220 defining a slot 222, it is understood that the base 220 may include a rib and the telescope 230 may define a slot.

Figure 6A:
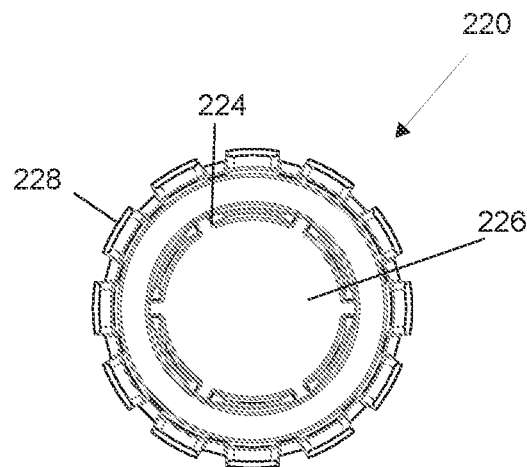
FIG. 6A is a top view of a base of the reusable product dispenser.
Figure 6B:
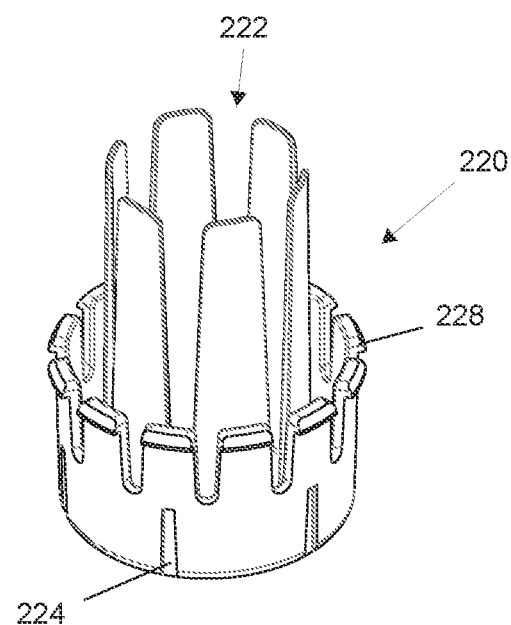
FIG. 6B is a perspective view of the base of the reusable product dispenser.
Figure 6C:
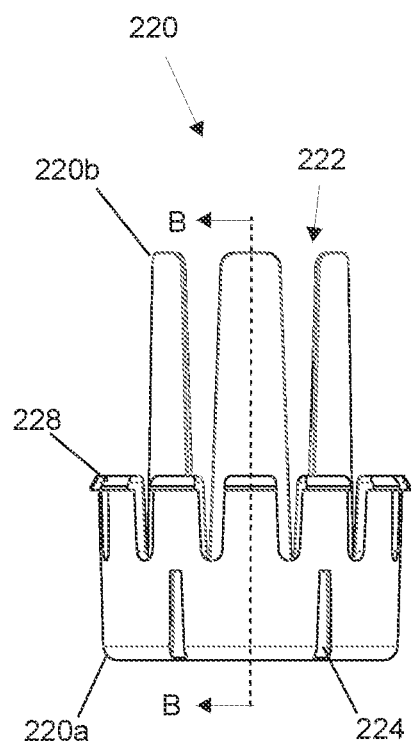
FIG. 6C is a side view of the base of the reusable product dispenser.
Figure 6D:
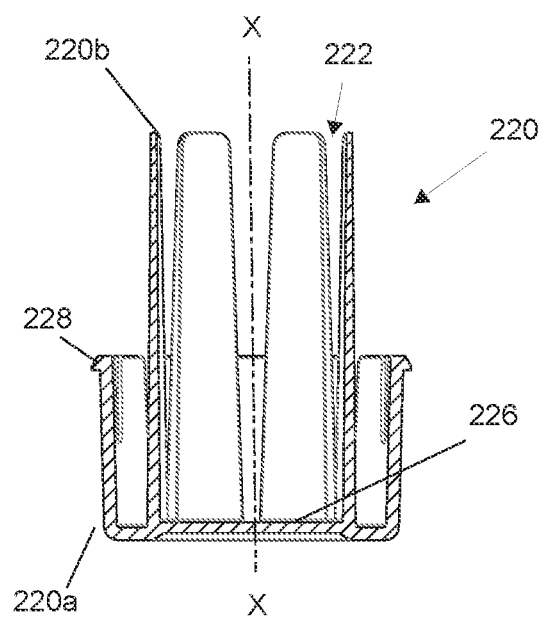
FIG. 6D is a side, cross-sectional, view of the base of the reusable product dispenser, taken along the line B-B in FIG. 6C.
Figure 8A:
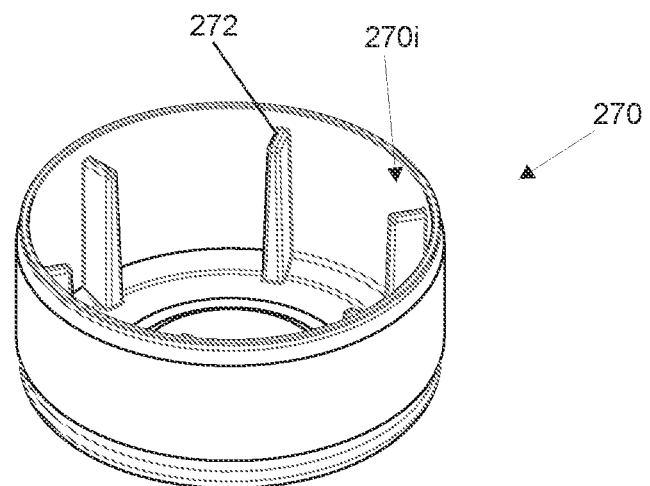
FIG. 8A is a perspective view of a base cover of the reusable product dispenser.
Figure 8B:
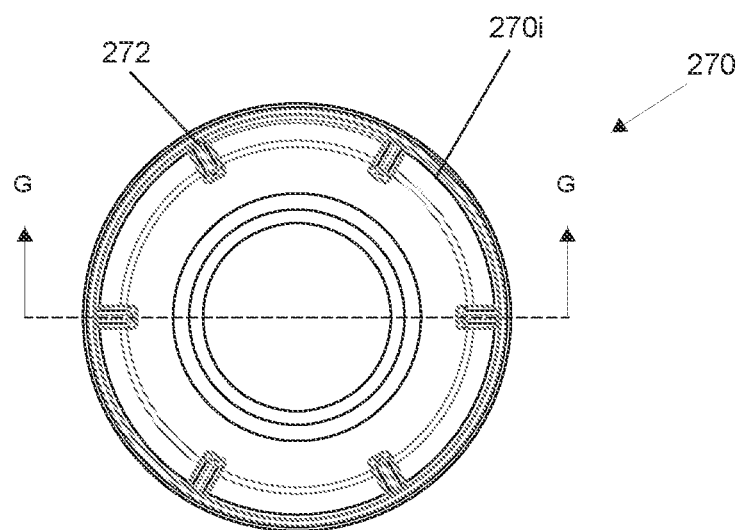
FIG. 8B is a top view of the base cover of the reusable product dispenser.
Figure 8C:
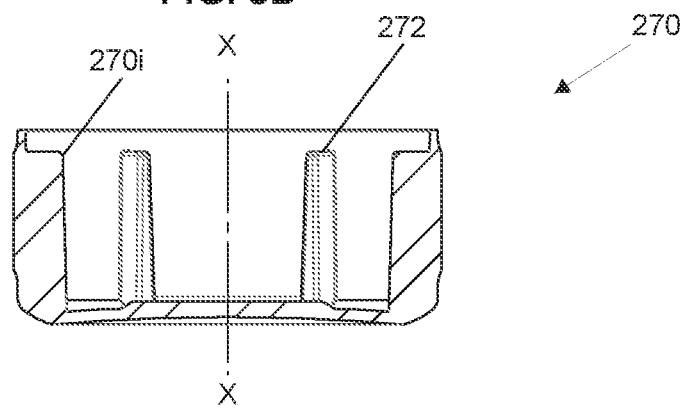
FIG. 8C is a side, cross-sectional, view of the base cover of the reusable product dispenser, taken along the line G-G in FIG. 8B.

The base 220 may include a base cover 270. The base cover 270 may include at least one interlocking protrusion 272 (FIG. 8A) disposed on an inner wall 270i of the base cover 270 configured to mate with at least one interlocking recess 224 (FIG. 6A) of the base 220. Movement (e.g., rotation) of the base cover 270 causes corresponding movement of the base 220 via the relationship between the interlocking protrusion 272 and the interlocking recess 224. Although shown and described as the base 220 including an interlocking recess 224 and the base cover 270 including an interlocking protrusion 272, in an aspect, the base 220 includes a protrusion and the base cover 270 includes a recess.

As described above, the proximal portion 230a of the telescope 230 is operably coupled to the base 220 and the telescope 230 is biased away from the base 220 via spring 240. As described in further detail below, a distal portion 230b of the telescope 230 is configured to operably couple to a portion (for example, the refill plunger 320) of the deodorant refill cartridge 300.

Figure 10A:
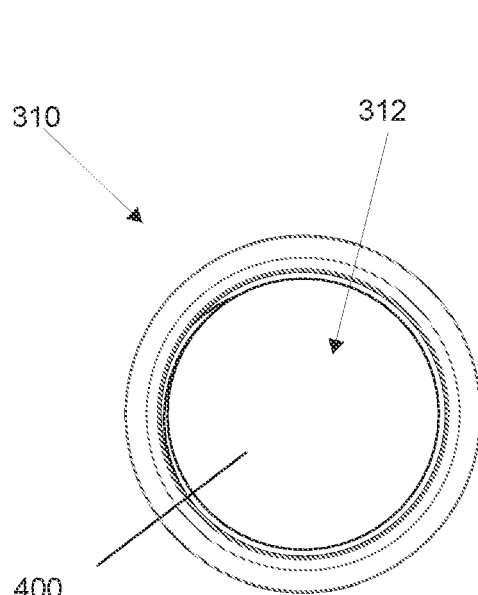
FIG. 10A is a top view of the deodorant refill cartridge of the deodorant dispensing apparatus.

The plurality of detents 232 of the telescope 230, defined on a distal portion 230b of the telescope 230, is configured to mate with a refill plunger 320 of the deodorant refill cartridge 300 when the deodorant refill cartridge 300 is coupled to the reusable product dispenser 200. In particular, at least one of the plurality of detents 232 mate with a proximal rib 328 (FIG. 10C) of the refill plunger 320. The plurality of detents 232 of the telescope 230 is configured to couple to the refill plunger 320 of the deodorant refill cartridge 300 such that rotation of the telescope 230 about the longitudinal axis X-X causes corresponding rotation of the refill plunger 320 about the longitudinal axis X-X. In an aspect, the plurality of detents 232 are defined along an outer wall 230o of the distal portion 230b of the telescope 230. Although illustrated and described as including a plurality of detents 232, telescope 230 may include only a single detent thereon.

The telescope 230 may be a single structure or may be a multi-component structure defined by a plurality of telescoping sub-components, configured to vary a length of the telescope 230 and transition between a first condition (having a shorter length) and a second condition (having a longer length). The first condition of the multi-component structured telescoping telescope 230 can have a minimal length and the second condition can have a maximum length.

The reusable product dispenser 200 may further include a housing sleeve 260. The sleeve 260 may wrap around the cylindrical housing 210. The housing sleeve 260 includes at least one latching mechanism opening 262 (FIG. 9B) thereon. The latching mechanism opening 262 may be disposed on the distal portion 260b of the housing sleeve 260 and may have a shape corresponding to the shape of the latching mechanism receiver 212 of the cylindrical housing 210. The opening 262 allows a user to access the latching mechanism 316 of the refill barrel 310, when the deodorant refill cartridge 300 is coupled to the cylindrical housing 210. The housing sleeve 260 includes a cylindrical opening on both the distal portion 260b and proximal portion 260a for positioning the cylindrical housing 210 therethrough. The sleeve 260 may be a single component sleeve or a multi-component sleeve including decorative elements thereon.

Deodorant dispensing apparatus 100 may also include a cover 25. The cover 250 includes an inner wall configured to operably couple to a distal portion 210b of the cylindrical housing 210. The inner wall of the cover 250 may be threaded or threadless. Additionally or alternatively, the cover 250 may be configured to operably couple to a distal portion 260b of the housing sleeve 260.

Figure 4:
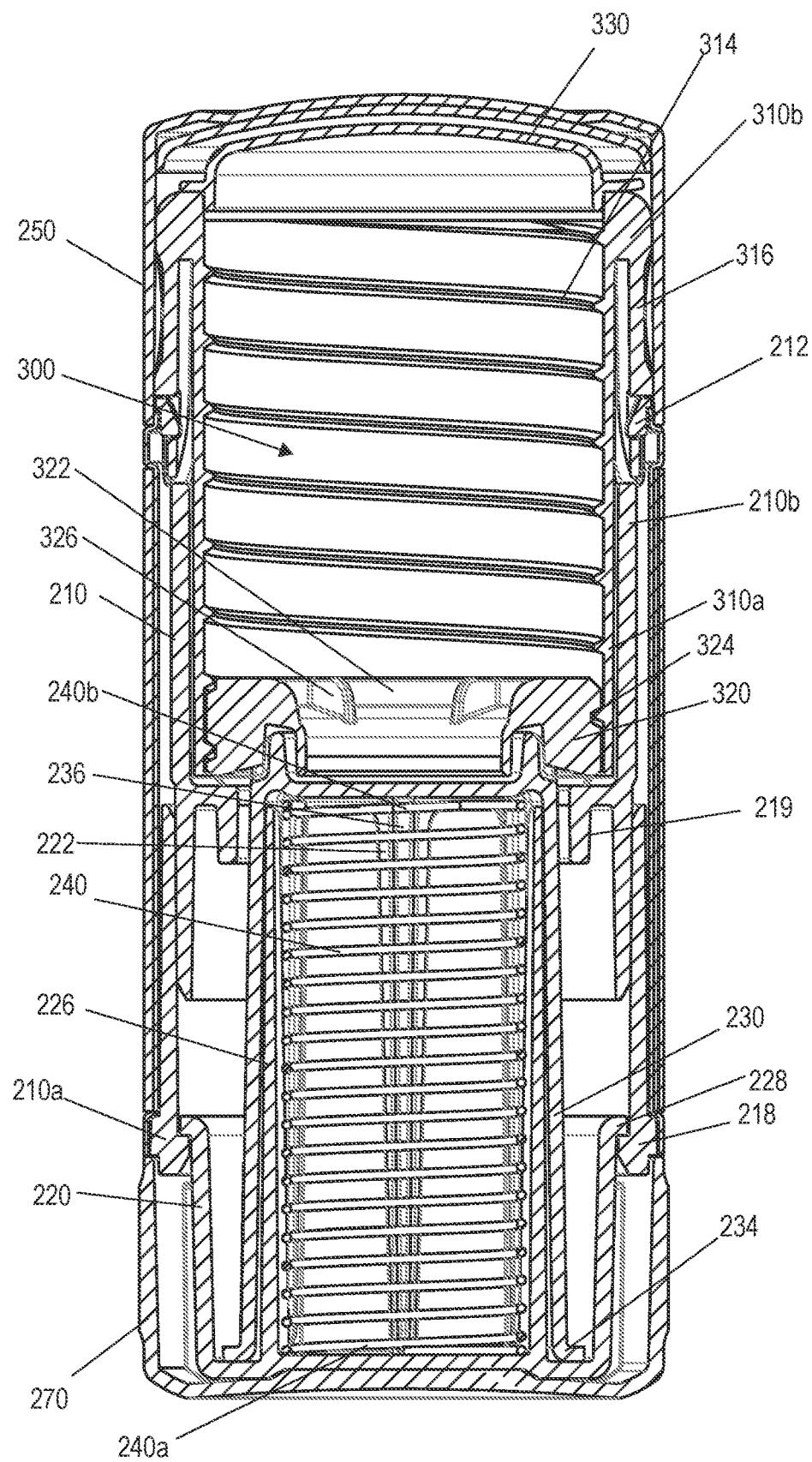
FIG. 4 is a side, cross-sectional, view of the reusable product dispenser of the deodorant dispensing apparatus with the deodorant refill cartridge of the deodorant dispensing apparatus assembled therewith.

Having described above the components of the reusable product dispenser 200, the components of the deodorant refill cartridge 300 will now be described in detail with reference to FIGS. 3A-3B and FIG. 4. The deodorant refill cartridge 300 includes a refill barrel 310 and a refill plunger 320 operably coupled to the refill barrel 310. The deodorant refill cartridge 300 may also include a cap 330. The refill barrel 310 of the deodorant refill cartridge 300 defines a cylindrical opening 312 (FIG. 10A), configured to retain a deodorant product 400 therein. As described above, the deodorant refill cartridge 300 is configured to releasably couple to the reusable product dispenser 200. When coupled to the reusable product dispenser 200, the deodorant refill cartridge 300 can be controlled to disperse an amount of the deodorant product 400 retained within the deodorant refill cartridge 300.

The refill barrel 310 includes a threaded inner wall 314 configured to mate with the threaded outer wall 324 of the refill plunger 320 such that rotation of the refill plunger 320 about the longitudinal axis X-X causes simultaneous distal advancement of the refill plunger 320 along the longitudinal axis X-X. The cap 330 is configured to operably couple (for example, removably couple) to the distal portion 310b of the refill barrel 310 to retain the deodorant product therein.

As described above, latching mechanism 316 of deodorant refill cartridge 300 is configured to mate with latching mechanism receiver 212 of reusable product dispenser 200 to releasably couple the deodorant refill cartridge 300 to the reusable product dispenser 000. The latching mechanism 316 may include a first latching mechanism 316a (FIG. 3B) and a second latching mechanism 316b (FIG. 3B), disposed on opposite sides of the distal portion 310b of the refill barrel 310 for releasably coupling the refill barrel 310 to a reusable product dispenser 200. Latching mechanism may include a finger recess 318 (FIG. 3B) to conform to the shape of a user's finger. In particular, in an aspect, latching mechanism 316a couples to latching mechanism receiver 212a and releases from latching mechanism receiver 212a when a user applies pressure to the latching mechanism 316a. Additionally, in an aspect, latching mechanism 316b couples to latching mechanism receiver 212b and releases from latching mechanism receiver 212b when a user applies pressure to the latching mechanism 316b.

The refill barrel 310 may include a level indicator 317 (FIG. 10B) disposed thereon. The level indicator 317 is configured to provide a view into the refill barrel 310 such that a user may view an amount of the deodorant product 400 remaining in the refill barrel 310. Additionally, the level indicator 317 of refill barrel 300 is positioned such that when the deodorant refill cartridge 300 is coupled to the reusable product dispenser 200, the level indicator 317 aligns with the level indicator 214 (FIG. 5B) of the cylindrical housing 210. With this aligned arrangement, a user may visualize the amount of deodorant product 400 remaining, even with the deodorant refill cartridge 300 is coupled to the reusable product dispenser 200.

Figure 10B:
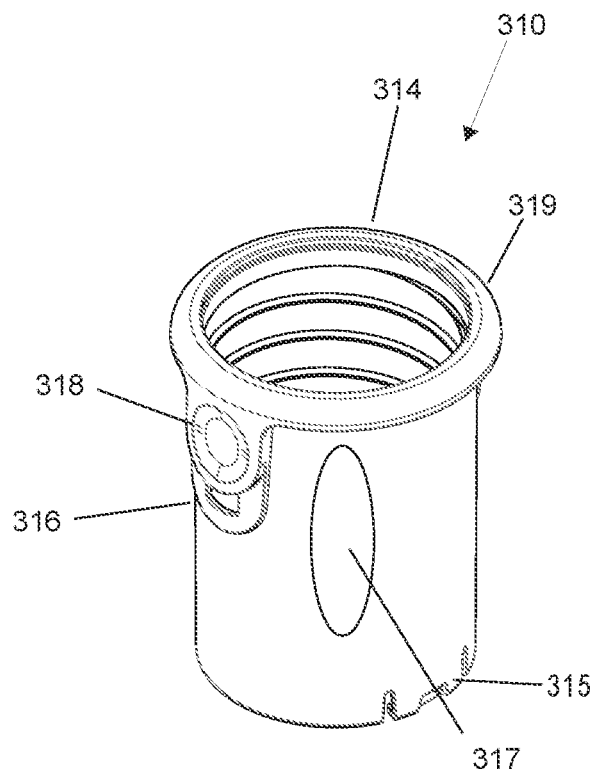
FIG. 10B is a perspective view of the deodorant refill cartridge of the deodorant dispensing apparatus.
Figure 10C:
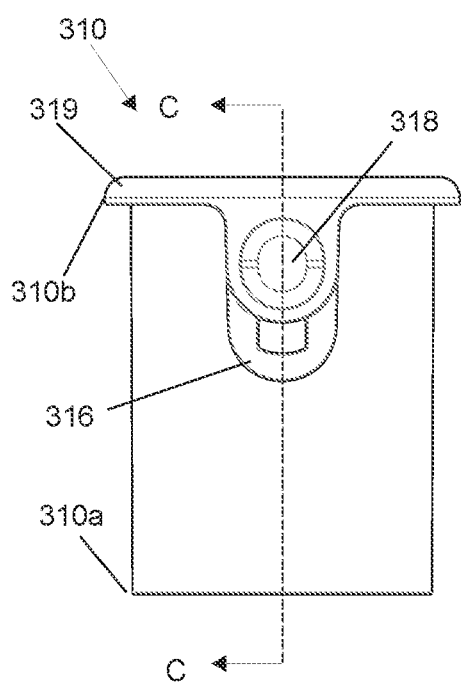
FIG. 10C is a side view of the deodorant refill cartridge of the deodorant dispensing apparatus.

The distal portion 310b of the refill barrel 310 may include a curved (e.g., rounded) edge 319 (FIG. 10B). The curved edge 319 provides the dual function of providing a stable connection between the deodorant refill cartridge 300 and the reusable product dispenser 200 and providing a smooth surface so as to not irritate a user's skin during use. The curved edge 319 may be formed by rounding the distal portion 310b of the refill barrel 310 by any suitable method including, but not limited to, bending or heat treating the distal portion 310b. In aspects, the curved edge 319 has a diameter larger than a diameter of the refill barrel 310 (e.g., a proximal portion 310a of the refill barrel 310).

The refill plunger 320 includes the threaded outer wall 324, at least one distal rib 326 disposed on a distal portion 320b (FIG. 10B) of the refill plunger 320 and at least one proximal rib 328 disposed on a proximal portion 320a of the refill plunger 320. The at least one distal rib 326 is configured to engage with the deodorant product 400 disposed within the cylindrical opening 312 of the refill barrel 310 (FIG. 10A). In this manner, rotational movement of the refill plunger 320 about the longitudinal axis X-X causes corresponding rotational movement of the deodorant product 400 engaged therewith along the longitudinal axis X-X. The at least one proximal rib 328 of the refill plunger 320 is configured to mate with the plurality of detents 232 (FIG. 7B) of the telescope 230 such that rotational movement of the telescope 230 about the longitudinal axis X-X causes corresponding rotation of the refill plunger 320 about the longitudinal axis X-X. With the refill plunger 320 engaging both of the deodorant product 400 (via distal rib 326) and the telescope (via proximal rib 328), the deodorant product 400 may be dispersed through the refill barrel 310 upon control of the telescope 230.

The refill plunger 320 defines a plunger opening 322 therethrough and is configured to receive deodorant product 400 in the molten state therethrough. In particular, when the refill plunger 320 is coupled to the refill barrel 310, the plunger opening 322 is used to introduce the deodorant product 400 into a chamber defined within the refill barrel 310. The liquid/gel product takes the shape of the refill barrel 310 and is retained therein in a solid, liquid or gel state. Additionally or alternatively, the plunger opening 322 may include a seal e.g., foil seal or any other capping structure to close the plunger opening 322. As described above, rotation of the refill plunger 320 in a first direction about the longitudinal axis X-X causes distal translation of the deodorant product 400 along the longitudinal axis X-X out of the distal portion 310b of the refill barrel 310. Similarly, rotation of the refill plunger 320 in a second direction about the longitudinal axis X-X may cause proximal translation of the deodorant product 400 along the longitudinal axis X-X.

Figure 10D:
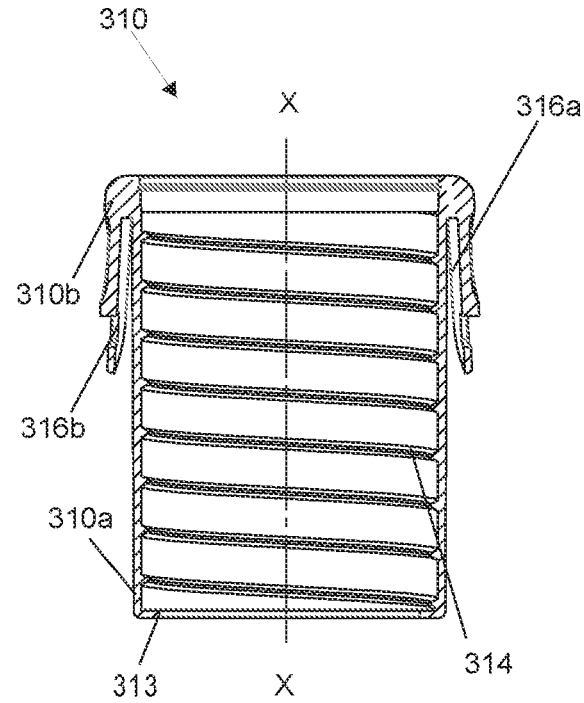
FIG. 10D is a side, cross-sectional, view of the deodorant refill cartridge, taken along the line C-C in FIG. 10C.
Figure 11A:
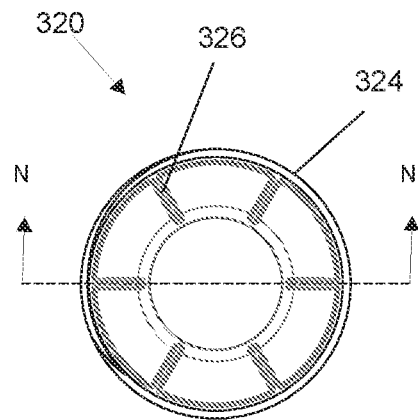
FIG. 11A is a top view of a refill plunger of the deodorant refill cartridge.
Figure 11B:
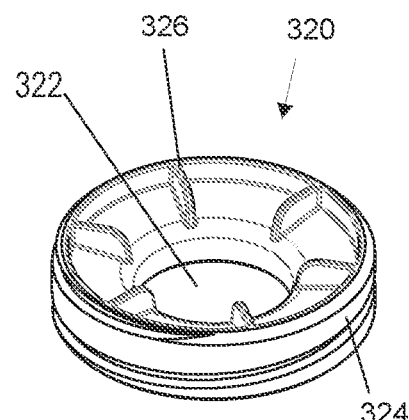
FIG. 11B is a perspective view of the refill plunger of the deodorant refill cartridge.
Figure 11C:
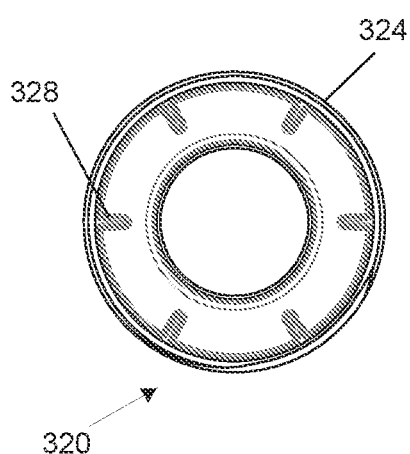
FIG. 11C is a bottom view of the refill plunger of the deodorant refill cartridge.
Figure 11D:
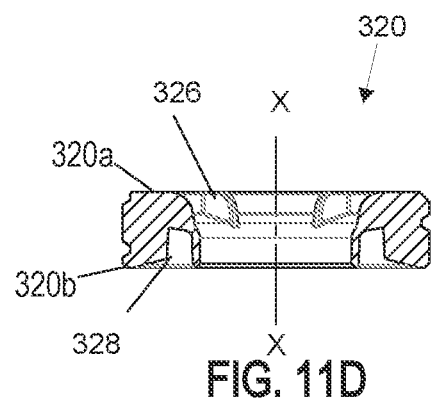
FIG. 11D is a side, cross-sectional, view of the refill plunger of the deodorant refill cartridge, taken along the line N-N in FIG. 11A.
Figure 11E:
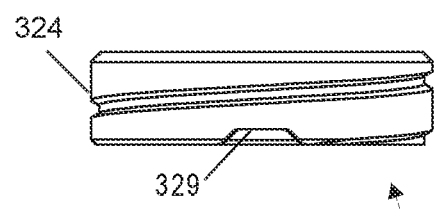
FIG. 11E is a side view of the refill plunger of the deodorant refill cartridge.

In an aspect, the refill barrel 310 includes an inwardly facing annular lip 313 (FIG. 10D) disposed on a proximal portion 310a thereof. The annular lip 313 has a diameter smaller than the inner diameter of the proximal portion 310a of the refill barrel 310 and prevents the refill plunger 320 from protruding out of the proximal portion 310a of the refill barrel 310. During manufacturing, the refill plunger 320 may be inserted into the cylindrical opening 312 of the refill barrel 310 and rotated therein until the refill plunger 320 is stopped by the annular lip 313. Additionally, the refill plunger 320 may define an opening 329 (FIG. 11E) configured to latch with a snap latch 315 (FIG. 10B) of the refill barrel 310 when positioned in (e.g., rotated to) the proximal portion 310a of the refill barrel 310.

Figure 12A:
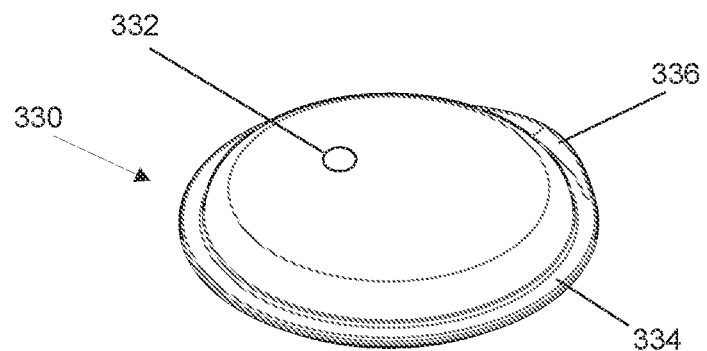
FIG. 12A is a perspective view of a cap of the deodorant refill cartridge.
Figure 12B:
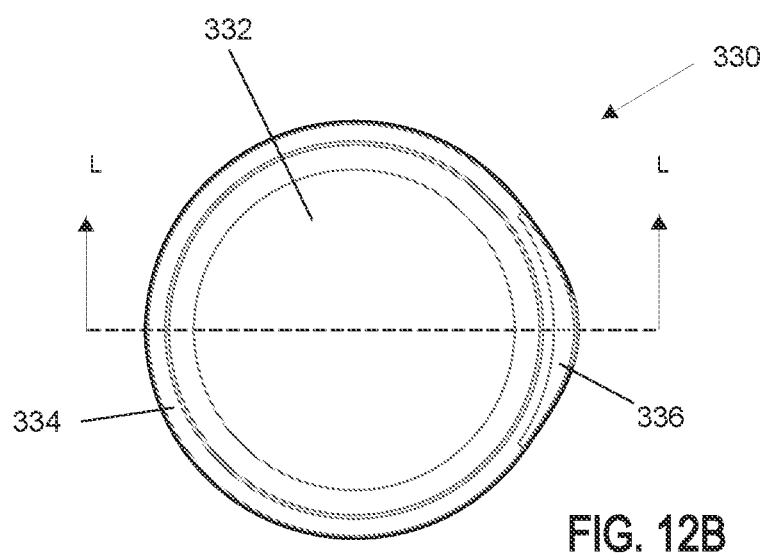
FIG. 12B is a top view of the cap of the deodorant refill cartridge.
Figure 12C:
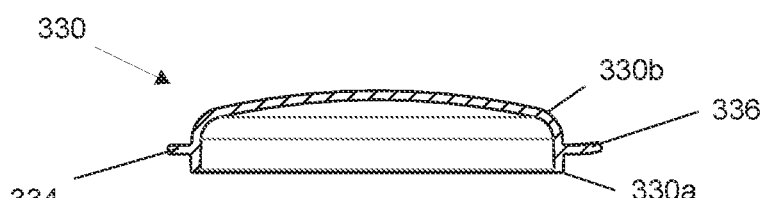
FIG. 12C is a side, cross-sectional, view of the cap of the deodorant refill cartridge, taken along the line L-L in FIG. 12B.

The cap 330 of the deodorant refill cartridge 300 is configured to operably couple to the distal portion 310b of the refill barrel 310. The cap 330 may include a lip 334 (FIGS. 12A-12C) extending outwardly from the cap 330 configured to rest on the curved edge 319 (FIG. 10B) of the refill barrel 310 and a tab 336 configured to allow for removability from distal portion 310b of the refill barrel 310. The cap 330 may include at least one aperture 332 disposed on distal portion 330b of the cap 330 configured to allow liquid/gel deodorant product 400 to be dispensed therethrough.

Figure 13:
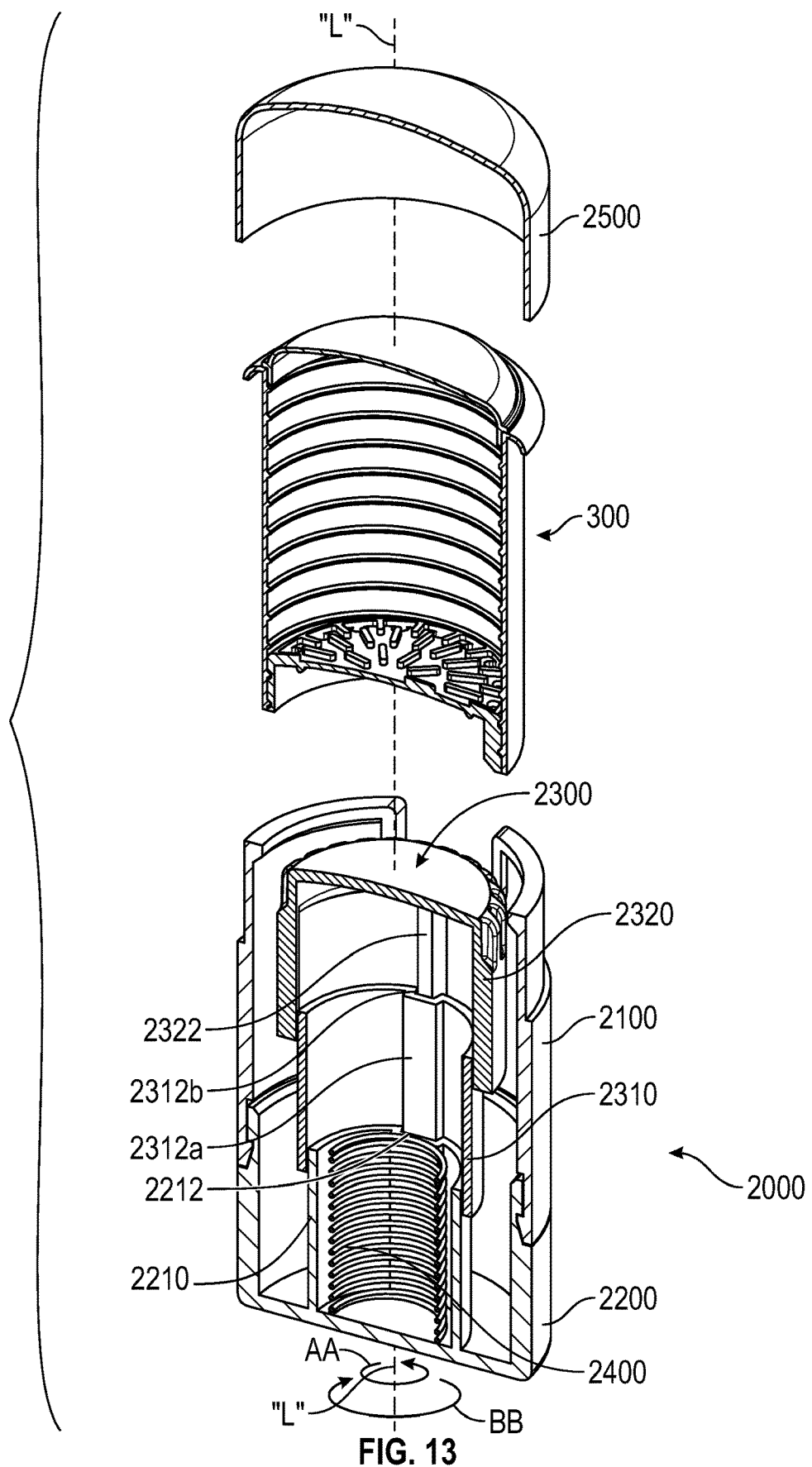
FIG. 13 is side perspective, cross-sectional, view of a product dispensing apparatus including a reusable product dispenser and a refill cartridge in accordance with another aspect of the present disclosure.
Figure 14:
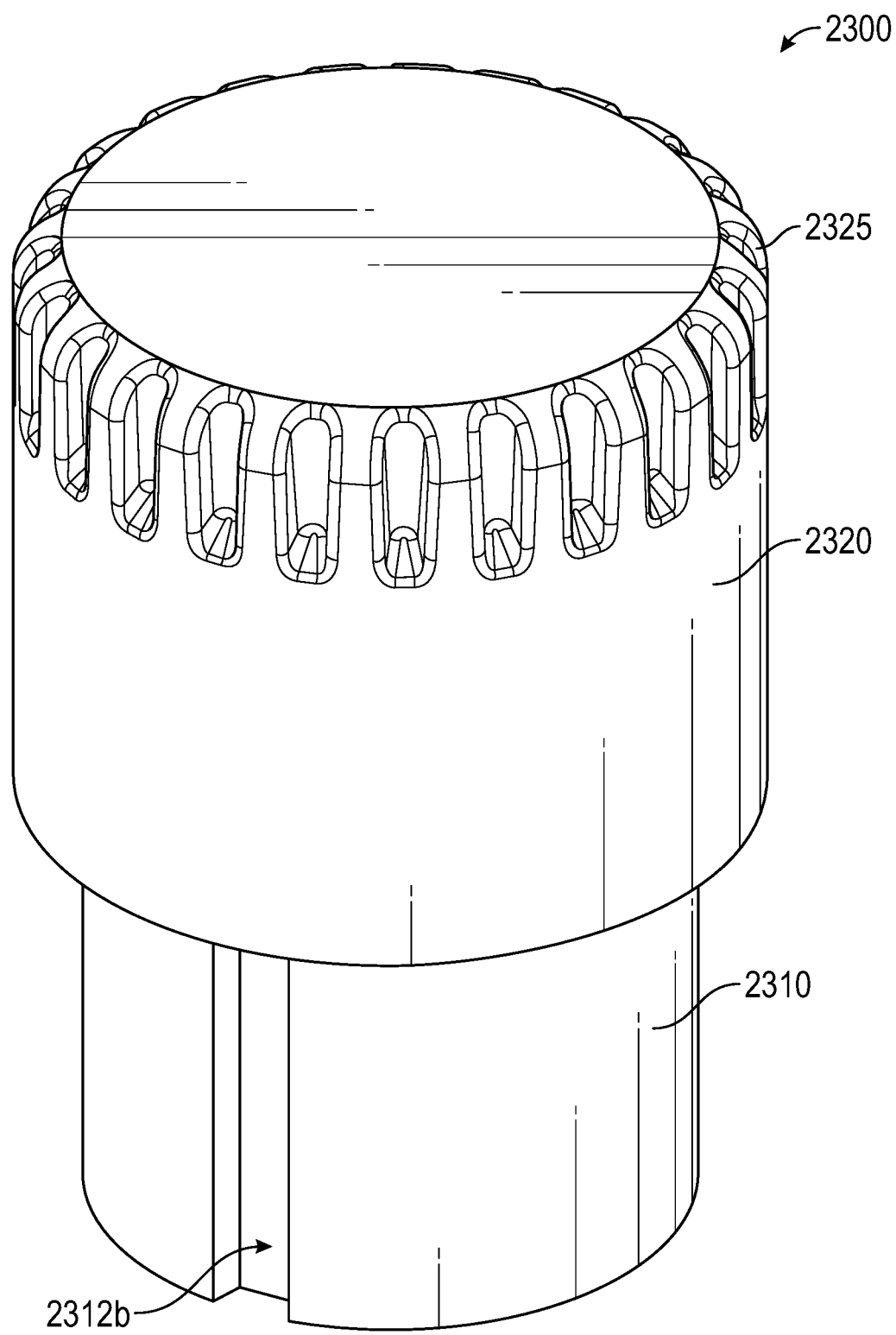
FIG. 14 is a front perspective view of a collapsible telescope assembly of the reusable product dispenser of the product dispensing apparatus of FIG. 13.

Turning now to FIGS. 13 and 14, another aspect of a product dispensing apparatus is illustrated and will be described as product dispensing apparatus 1000. Product dispensing apparatus 1000 is similar to apparatus 100 described above, includes all or some of the components and operates in the same manner, and therefore, only the differences therebetween will be described in detail for brevity. Product dispensing apparatus 1000 includes a reusable product dispenser 2000 and a product refill cartridge 300 configured to operably couple to the reusable product dispenser 2000 to dispense a product from the product refill cartridge 300.

The product refill cartridge 300 may be at least partially inserted into, and selectively releasably coupled to, the reusable product dispenser 2000. As described above, the product refill cartridge 300 is configured to house a deodorant, antiperspirant, cosmetic, or other skin-applyable product therein. When the refill cartridge 300 is coupled to the reusable product dispenser 2000, the reusable product dispenser 2000 can be manipulated to dispense the product from the refill cartridge 300. Upon depletion of the product housed within the refill cartridge 300, the refill cartridge 300 can be removed from the reusable product dispenser 2000, disposed of (or refilled with new product for subsequent use), and a new (or refilled) refill cartridge 300 can be coupled to the reusable product dispenser 2000 for continued use.

The reusable product dispenser 2000 includes a housing 2100, a base 2200, a telescope assembly 2300, and a resilient member 2400 disposed between the base 2200 and the telescope assembly 2300. In aspects, the reusable product dispenser 2000 additionally includes a cover 2500 removably couplable to the housing 2100. In one aspect the housing 2100 and/or the cover 2500 are cylindrical in shape. The housing 2100 defines a longitudinal axis L-L (FIG. 13) and the base 2200 is rotatably coupled to the housing 2100 and configured to rotate relative to the housing 2100 about the longitudinal axis L-L in a first direction (indicated by arrow AA) and a second direction (indicated by arrow BB). In an aspect, the base 2200 includes a centrally-located protrusion 2210 extending distally therefrom toward the housing 2100 and defining at least one guide 2212 thereon, for example, along an outer or inner surface of the protrusion 2210. Protrusion 2210 may be cylindrical in shape, but other geometric profiles are appreciated. As shown in FIG. 13, guide 2212 extends longitudinally parallel to the longitudinal axis L-L, however guide 2212 may extend circumferentially, fully or partially, around the outer or inner surface of the protrusion 2210. Guide 2212 may be a recess, protrusion, indent, groove, channel or any other suitable structure formed in, formed on, or coupled to protrusion 2210 or any other portion of base 2200.

The telescope assembly 2300 is operably coupled to the base 2200, for example, to the protrusion 2210 of base 2200, and is configured to move relative to the base 2200 along the longitudinal axis L-L. The telescope assembly 2300 includes a proximal section 2310 and a distal section 2320 slidingly coupled to the proximal section 2310. The distal section 2320 is movable relative to the proximal section 2310 between a fully collapsed condition, where the telescope assembly 2300 defines its shortest length, and a fully extended condition (shown in FIG. 13), where the telescope assembly 2300 defines its longest length. When a full refill cartridge 300 is coupled to the reusable product dispenser 2000, the telescope assembly 2300 is forced to the fully collapsed condition (not shown). In contrast, when no refill cartridge 300 is coupled to the reusable product dispenser 2000, the telescope assembly 2300 is in the fully extended condition (FIG. 13). A stop mechanism may be included in at least one of the distal section 2320 or the proximal section 2310 to prevent the disassembly or separation of the components of the telescope assembly 2300. In one aspect, the proximal section 2310 and the distal section 2320 are cylindrical in shape and an inner diameter of the distal section 2320 is larger than an outer diameter of the proximal section 2310 such that the proximal section 2310 is receivable within the distal section 2320, but a reverse configuration and other geometric profiles are also appreciated. The distal section 2320 includes at least one alignment member 2325 configured to mate with a corresponding alignment member (not shown) of the refill cartridge 300, the details of which are described above. In an aspect, a guide 2312b is defined along a length of the proximal section 2310 which is fitted to engage with a corresponding rail 2322 defined by the distal section 2320, although a reverse configuration is also appreciated. While only a single guide 2312b and a single rail 2322 is shown in FIG. 13, it is contemplated that any number of guides 2312b and corresponding rails 2322 may be formed on the components of the telescope assembly 2300. Additionally, while illustrated and described as including two sections (e.g., proximal section 2310 and distal section 2320), telescope assembly 2300 may include any number of sections including any number of additional intermediate sections between proximal section 2310 and distal section 2320.

The resilient member 2400 (e.g., a spring) is disposed between the base 2200 and at least a portion of the telescope assembly 2300 and biases at least one of the distal section 2320 or the proximal section 2310 of telescope assembly 2300 away from the base 2200 toward the fully extended condition. The telescope assembly 2300 is operably coupled to the base 2200 such that rotation of the base 2200 about the longitudinal axis L-L in either the first direction (AA) or the second direction (BB), causes corresponding rotation of the telescope assembly 2300 about the longitudinal axis L-L in the same direction. In an aspect, the base 2200 is interlocked with at least one of the proximal section 2310 or the distal section 2320 of the telescope assembly 2300 such that the proximal section 2310 and/or the distal section 2320 can move along the longitudinal axis L-L defined by the housing 2100. For example, in an aspect, as described above the base 2200 may include a guide 2212 extending longitudinally along a surface of protrusion 2210 and configured to receive a corresponding rail 2312a extending along an inner surface of the proximal section 2310 of the telescope assembly 2300, although a reverse configuration is appreciated. In an aspect, the rail 2312a and the guide 2312b of the proximal section 2310 are a single detent formed along the surface of the proximal section 2310 of the telescope assembly 2300 defining the guide 2312b on the outer surface and the rail 2312a on the inner surface. Additionally, a stop member may be formed on at least one of the telescope assembly 2300 or the base 2200 to prevent the disassembly of the telescope assembly 2300 from the base 2200.

While several aspects of the disclosure have been shown in the drawings, it is not intended that the disclosure be limited thereto, as it is intended that the disclosure be as broad in scope as the art will allow and that the specification be read likewise. Any combination of the above aspects is also envisioned and is within the scope of the appended claims. Therefore, the above description should not be construed as limiting, but merely as exemplifications of various aspects of the disclosure. Those skilled in the art will envision other modifications within the scope and spirit of the claims appended hereto.

The invention claimed is:

1. A product dispensing apparatus comprising:
   a reusable product dispenser comprising:
   a housing defining a longitudinal axis;
   a base rotatably coupled to a proximal portion of the housing and configured to rotate about the longitudinal axis in a first direction and a second direction; and
   a telescope assembly including a proximal section and a distal section movable relative to the proximal section along the longitudinal axis defined by the housing between a collapsed condition and an extended condition, at least one of the proximal section or the distal section operably coupled to the base such that rotation of the base about the longitudinal axis causes corresponding rotation of the telescope assembly about the longitudinal axis, wherein the proximal section of the telescope assembly includes at least one of a guide configured to longitudinally slide along a rail of the base or a rail configured to longitudinally slide along a guide of the base; and
   a refill cartridge configured to releasably couple to the reusable product dispenser.

2. The product dispensing apparatus according to claim 1, wherein the proximal section of the telescope assembly is configured to fit at least partially within the distal section of the telescope assembly.

3. The product dispensing apparatus according to claim 1, wherein the proximal section of the telescope assembly includes at least one of a guide configured to slide along a rail of the distal section of the telescope assembly or a rail configured to slide along a guide of the distal section of the telescope assembly.

4. The product dispensing apparatus according to claim 1, wherein the refill cartridge is configured to releasably couple to the telescope assembly.

5. The product dispensing apparatus according to claim 1, wherein the refill cartridge is configured to releasably couple to housing.

6. The product dispensing apparatus according to claim 1, wherein the reusable product dispenser includes a resilient member disposed between the base and the telescope assembly and configured to bias the telescope assembly to the extended condition.

7. The product dispensing apparatus according to claim 1, wherein the housing is cylindrical in shape.

8. The product dispensing apparatus according to claim 1, wherein the telescope assembly is cylindrical in shape.

9. A reusable product dispenser for use with a product refill cartridge, the reusable product dispenser comprising:
   a housing defining a longitudinal axis;
   a base rotatably coupled to a proximal portion of the housing and configured to rotate about the longitudinal axis in a first direction and a second direction; and
   a telescope assembly including a proximal section and a distal section movable relative to the proximal section along the longitudinal axis defined by the housing between a collapsed condition and an extended condition, at least one of the proximal section or the distal section operably coupled to the base such that rotation of the base about the longitudinal axis causes corresponding rotation of the telescope assembly about the longitudinal axis, wherein the proximal section of the telescope assembly includes at least one of a guide configured to longitudinally slide along a rail of the base or a rail configured to longitudinally slide along a guide of the base.

10. The reusable product dispenser according to claim 9, wherein the proximal section of the telescope assembly is configured to fit at least partially within the distal section of the telescope assembly.

11. The reusable product dispenser according to claim 9, wherein the proximal section of the telescope assembly includes at least one of a guide configured to slide along a rail of the distal section of the telescope assembly or a rail configured to slide along a guide of the distal section of the telescope assembly.

12. The reusable product dispenser according to claim 9, wherein the base includes a centrally-located protrusion extending distally therefrom.

13. The reusable product dispenser according to claim 12, wherein the proximal section of the telescope assembly is disposed circumferentially around the protrusion of the base and the distal section of the telescope assembly is disposed circumferentially around the proximal section of the telescope assembly.

14. The reusable product dispenser according to claim 9, wherein the reusable product dispenser includes a resilient member disposed between the base and the telescope assembly configured to bias the telescope assembly to the extended condition.

15. The reusable product dispenser according to claim 9, wherein the housing is cylindrical in shape.

16. The reusable product dispenser according to claim 9, wherein the telescope assembly is cylindrical in shape.

17. A reusable product dispenser for use with a product refill cartridge, the reusable product dispenser comprising:
   a housing defining a longitudinal axis;
   a base rotatably coupled to a proximal portion of the housing and configured to rotate about the longitudinal axis in a first direction and a second direction;
   a telescope assembly including a proximal section and a distal section movable relative to the proximal section along the longitudinal axis defined by the housing between a collapsed condition and an extended condition, at least one of the proximal section or the distal section operably coupled to the base such that rotation of the base about the longitudinal axis causes corresponding rotation of the telescope assembly about the longitudinal axis; and
   a resilient member configured to bias the telescope assembly to the extended condition.

* * * * *